(12) United States Patent
Nan et al.

(10) Patent No.: US 11,277,793 B2
(45) Date of Patent: Mar. 15, 2022

(54) METHOD FOR INDICATING BASE STATION CAPABILITY AND APPARATUS (71) Applicant: Huawei Technologies Co., Ltd., Shenzhen (CN)

(72) Inventors: Fang Nan, Beijing (CN); Zheng Yu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 11 days.

(21) Appl. No.: 15/663,357

(22) Filed: Jul. 28, 2017

(65) Prior Publication Data

US 2017/0332325 A1 Nov. 16, 2017

Related U.S. Application Data

(63) Continuation of application No. PCT/CN2015/072047, filed on Jan. 30, 2015.

(51) Int. Cl.
*H04W 52/02* (2009.01)
*H04W 24/02* (2009.01)
*H04W 72/04* (2009.01)

(52) U.S. Cl.
CPC ....... *H04W 52/0219* (2013.01); *H04W 24/02* (2013.01); *H04W 72/042* (2013.01); *Y02D 30/70* (2020.08)

(58) Field of Classification Search
CPC ....... H04W 24/02; H04W 48/16; H04W 8/22; H04W 48/20; H04W 74/0833;
(Continued)

(56) References Cited

U.S. PATENT DOCUMENTS

2011/0019615 A1\* 1/2011 Krco .............. H04W 48/12
370/328
2012/0039293 A1\* 2/2012 Feng .............. H04L 5/0044
370/329
(Continued)

FOREIGN PATENT DOCUMENTS

CN  102215511 A  10/2011
CN  103119868 A   5/2013
(Continued)

OTHER PUBLICATIONS

3rd Generation Partnership Project; Technical Specification Group Radio Access Network; Evolved Universal Terrestrial Radio Access (E-UTRA); User Equipment (UE) radio transmission and reception (Release 12), 3GPP TS 36.101 V12.6.0 (Dec. 2014), 589 pages.
(Continued)

*Primary Examiner* — Ajibola A Akinyemi
(74) *Attorney, Agent, or Firm* — Slater Matsil, LLP (57) ABSTRACT

Embodiments of the present invention provide a method for indicating a base station capability and an apparatus and relate to the communications field, so as to indicate whether a base station supports UE of a first type or a capability of coverage enhancement, so that the UE accesses the base station only when the requirement of the UE conforms to the capability supported by the base station. The method includes sending, by the base station, a first information block to user equipment UE, where the first information block carries first information, and the first information is used to indicate a capability of the base station.

12 Claims, 2 Drawing Sheets

(58) Field of Classification Search
CPC ..... H04W 24/08; H04W 24/10; H04W 28/08; H04W 36/0088; H04W 4/70; H04W 72/042
USPC .......................................................... 455/574
See application file for complete search history.

(56) References Cited

U.S. PATENT DOCUMENTS

| | | | |
|---|---|---|---|
| 2013/0064119 | A1 | 3/2013 | Montojo et al. |
| 2013/0178216 | A1 | 7/2013 | Chang et al. |
| 2015/0016312 | A1* | 1/2015 | Li ................... H04W 74/006 370/280 |
| 2015/0257173 | A1 | 9/2015 | You et al. |
| 2015/0327155 | A1* | 11/2015 | Lee ................... H04W 48/12 370/329 |
| 2016/0150462 | A1 | 5/2016 | Yang et al. |
| 2016/0198438 | A1* | 7/2016 | Wong ................ H04W 72/04 370/329 |
| 2018/0035311 | A1* | 2/2018 | Yang ................. H04W 16/14 |
| 2018/0124772 | A1* | 5/2018 | Futaki ................ H04W 4/70 |
| 2018/0139743 | A1* | 5/2018 | Yang ................. H04L 1/1812 |

FOREIGN PATENT DOCUMENTS

| | | | |
|---|---|---|---|
| CN | 103581960 A | 2/2014 | |
| CN | 103828457 A | 5/2014 | |
| CN | 103959878 A | 7/2014 | |
| CN | 104104467 A | 10/2014 | |
| CN | 104219767 A | 12/2014 | |
| JP | 2010516163 A | 5/2010 | |
| WO | 2014109566 A1 | 7/2014 | |
| WO | 2014204285 A1 | 12/2014 | |
| WO | 2015009063 A1 | 1/2015 | |
| WO | WO-2015018482 A1 * | 2/2015 | ........ H04W 52/0216 |

OTHER PUBLICATIONS

3rd Generation Partnership Project; Technical Specification Group Radio Access Network; Evolved Universal Terrestrial Radio Access (E-UTRA); Physical layer procedures (Release 12), 3GPP TS 36.213 V12.4.0 (Dec. 2014), 225 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 3GPP TS 36.300 V12.4.0 (Dec. 2014), 251 pages.

3rd Generation Partnership Project; Technical Specification Group Radio Access Network; Evolved Universal Terrestrial Radio Access (E-UTRA); User Equipment (UE) radio access capabilities (Release 12), 3GPP TS 36.306 V12.3.0 (Dec. 2014), 36 pages.

3rd Generation Partnership Project; Technical Specification Group Radio Access Network; Evolved Universal Terrestrial Radio Access (E-UTRA); Radio Resource Control (RRC); Protocol specification(Release 12), 3GPP TS 36.331 V12.4.1 (Dec. 2014), 410 pages.

CATT, "SIB Coverage Improvement for MTC UEs", 3GPP TSG RAN WG1 Meeting #75, R1-135064, San Francisco, CA, USA, Nov. 11-15, 2013, 2 pages.

Nokia Networks et al., "Design of Common Control Messages for MTC," 3GPP T5G-RAN WG1 Meeting #79, R1-144996, San Francisco, CA, USA, Nov. 17-21, 2014, 2 pages.

RAN1, "LS on PBCH and RACH for LTE Rel-13 MAC," 3GPP TSG RAN WG1 Meeting #79, R1-145495, San Francisco, CA, USA, Nov. 17-21, 2014, 2 pages.

Sony, "Enhanced Coverage Mobility Issues," 3GPP TSG-RAN WG2 Meeting #84, R2-133821, San Francisco, CA, USA, Nov. 11-15, 2013, 4 pages.

Huawei et al., "RAN2 Impacts of Low Cost MTC," 3GPP TSG-RAN WG2 #85, R2-140277, Prague, Czech Republic, Feb. 10-14, 2014, 4 pages.

Media Tek Inc., "Impact of Low-Cost MTC on RAN2," 3GPP TSG-RAN2 #85 Meeting, R2-140524, Prague, Czech Republic, Feb. 10-14, 2014, 6 pages.

Sony, "SIB scheduling for MTC," 3GPP TSG-RAN WG2 Meeting #89,R2-150184, Athens, Greece, Feb. 9-13, 2015, 6 pages.

Ericsson et al., "EAB SI considerations for LTE", 3GPP TSG-RAN WG2#77, Tdoc R2-120458, Dresden, Germany, Feb. 6-10, 2012, 7 pages.

* cited by examiner

METHOD FOR INDICATING BASE STATION CAPABILITY AND APPARATUS

CROSS-REFERENCE TO RELATED APPLICATIONS

This application is a continuation of International Application No. PCT/CN2015/072047, field on Jan. 30, 2015, the disclosure of which is hereby incorporated by reference in its entirety.

TECHNICAL FIELD

The present invention relates to the communications field, and in particular, to a method for indicating a base station capability and an apparatus.

BACKGROUND

In existing communications systems, because a quantity of user equipments (UEs) is large, to reduce system consumption, some low-complexity and low-cost UEs are put forward. Technologies used by low-complexity and low-cost UE are mainly: a single receive antenna, reducing a size of a maximum transmission block supported by the UE, half-duplex, reducing bandwidth of a receive signal and a transmit signal that are supported by the UE, reducing maximum transmit power of the UE, reducing a downlink transmission mode supported by the UE, and the like.

In existing communications systems, some base stations support low-complexity (or low-cost) UE, and some base stations do not support low-complexity UE; some base stations support coverage enhancement, and some base stations do not support coverage enhancement. UE cannot know whether the base station supports low-complexity UE or whether the base station supports coverage enhancement. Therefore, the UE blindly tries to access a base station. If the base station does not support low-complexity UE or does not support coverage enhancement, the UE consumes power of the UE in a process of trying to access the base station, causing waste of power of the UE.

SUMMARY

Embodiments of the present invention provide a method for indicating a base station capability and an apparatus, so as to indicate whether a base station supports a user equipment (UE) of a first type or a capability of coverage enhancement, so that the UE accesses the base station only when a requirement of the UE conforms to the capability supported by the base station, reducing power consumption of the UE of the first type.

To achieve the foregoing objective, the following technical solutions are used in the embodiments of the present invention.

According to a first aspect, an embodiment of the present invention provides a method for indicating a base station capability, where the method includes sending, by a base station, a first information block to a user equipment (UE), where the first information block carries first information, and the first information is used to indicate a capability of the base station. The capability of the base station is the base station does not support access by UE of a first type and the base station does not support coverage enhancement, the base station supports access by the UE of the first type and the base station supports coverage enhancement, or the base station supports access by the UE of the first type and the base station does not support coverage enhancement, the base station does not support access by the UE of the first type and the base station supports coverage enhancement. Alternatively, the capability of the base station is the base station does not send a first system information block (SIB), or the base station sends the first SIB, where the first SIB includes system information that at least one of the UE of the first type or UE supporting coverage enhancement needs to receive.

With reference to the first aspect, in a first possible implementation manner of the first aspect, if the first information is used to indicate that the base station does not send the first SIB, the capability of the base station indicated by the first information is further: the base station does not support access by the UE of the first type and the base station does not support coverage enhancement; or if the first information is used to indicate that the base station sends the first SIB, the capability of the base station indicated by the first information is further: the base station supports access by the UE of the first type and the base station supports coverage enhancement, or the base station supports access by the UE of the first type and the base station does not support coverage enhancement, or the base station does not support access by the UE of the first type and the base station supports coverage enhancement.

With reference to the first possible implementation manner of the first aspect, in a second possible implementation manner of the first aspect, the first SIB includes one SIB or two SIBs.

With reference to the first aspect, in a third possible implementation manner of the first aspect, if the first information indicates a degree of coverage enhancement supported by the base station, the capability of the base station indicated by the first information is: the base station supports access by the UE of the first type and the base station supports coverage enhancement, or the base station does not support access by the UE of the first type and the base station supports coverage enhancement.

With reference to the first aspect, the first possible implementation manner of the first aspect, and the second possible implementation manner of the first aspect, in a fourth possible implementation manner of the first aspect, the first information includes one bit, where one state of the one bit is used to indicate: the base station does not support access by the UE of the first type and the base station does not support coverage enhancement, and another state of the one bit is a reserved state; or one state of the bit is used to indicate: the base station does not support access by the UE of the first type and the base station does not support coverage enhancement, and another state of the one bit is used to indicate: the base station supports access by the UE of the first type and the base station supports coverage enhancement, or the base station supports access by the UE of the first type and the base station does not support coverage enhancement, or the base station does not support access by the UE of the first type and the base station supports coverage enhancement; or one state of the one bit is used to indicate: the base station does not send the first SIB; another state of the one bit is used to indicate: the base station sends the first SIB; or one state of the one bit is used to indicate: a degree of coverage enhancement supported by the base station, and another state of the one bit is a reserved state.

With reference to the first aspect and the first possible implementation manner of the first aspect to the fourth possible implementation manner of the first aspect, in a fifth possible implementation manner of the first aspect, the first information block is a master information block (MIB) or is a first information block received when the UE accesses the base station.

With reference to the third possible implementation manner of the first aspect, in a sixth possible implementation manner of the first aspect, the first information is an information element in the first information block or a second SIB, and the information element is at least one of a threshold parameter, an offset parameter, a quantity of levels of coverage enhancement supported by the base station, or a coverage enhancement amount corresponding to each coverage enhancement level, and the second SIB is any one of SIBs.

With reference to any one of the first aspect or the first possible implementation manner of the first aspect to the sixth possible implementation manner of the first aspect, in a seventh possible implementation manner of the first aspect, the UE of the first type is UE working at a specific frequency width of a carrier, and the specific frequency width is less than bandwidth of the carrier.

According to a second aspect, an embodiment of the present invention provides a method for indicating a base station capability. The method includes obtaining, by UE, a first information block sent by a base station, where the first information block carries first information, and the first information is used to indicate a capability of the base station. The capability of the base station is the base station does not support access by UE of a first type and the base station does not support coverage enhancement, the base station supports access by the UE of the first type and the base station supports coverage enhancement, the base station supports access by the UE of the first type and the base station does not support coverage enhancement, or the base station does not support access by the UE of the first type and the base station supports coverage enhancement. Alternatively the capability of the base station is the base station does not send a first SIB, or the base station sends the first SIB, where the first SIB includes system information that at least one of the UE of the first type or UE supporting coverage enhancement needs to receive. The method also includes determining, by the UE, the capability of the base station according to the first information carried in the first information block.

With reference to the second aspect, in a first possible implementation manner of the second aspect, if the first information is used to indicate that the base station does not send the first SIB, the capability of the base station indicated by the first information is further: the base station does not support access by the UE of the first type and the base station does not support coverage enhancement; or if the first information is used to indicate that the base station sends the first SIB, the capability of the base station indicated by the first information is further: the base station supports access by the UE of the first type and the base station supports coverage enhancement, or the base station supports access by the UE of the first type and the base station does not support coverage enhancement, or the base station does not support access by the UE of the first type and the base station supports coverage enhancement.

With reference to the first possible implementation manner of the second aspect, in a second possible implementation manner of the second aspect, the first SIB includes one SIB or two SIBs.

With reference to the second aspect, in a third possible implementation manner of the second aspect, if the first information indicates a degree of coverage enhancement supported by the base station, the capability of the base station indicated by the first information is: the base station supports access by the UE of the first type and the base station supports coverage enhancement, or the base station does not support access by the UE of the first type and the base station supports coverage enhancement.

With reference to the second aspect, the first possible implementation manner of the first aspect, or the second possible implementation manner of the second aspect, in a fourth possible implementation manner of the second aspect, the first information includes one bit, where one state of the one bit is used to indicate: the base station does not support access by the UE of the first type and the base station does not support coverage enhancement, and another state of the one bit is a reserved state; or one state of the bit is used to indicate: the base station does not support access by the UE of the first type and the base station does not support coverage enhancement, and another state of the one bit is used to indicate: the base station supports access by the UE of the first type and the base station supports coverage enhancement, or the base station supports access by the UE of the first type and the base station does not support coverage enhancement, or the base station does not support access by the UE of the first type and the base station supports coverage enhancement; or one state of the one bit is used to indicate: the base station does not send the first SIB; another state of the one bit is used to indicate: the base station sends the first SIB; or one state of the one bit is used to indicate: a degree of coverage enhancement supported by the base station, and another state of the one bit is a reserved state.

With reference to any one of the second aspect or the first possible implementation manner of the second aspect to the fourth possible implementation manner of the second aspect, in a fifth possible implementation manner of the second aspect, the first information block is a MIB or is a first information block received when the UE accesses the base station.

With reference to the third possible implementation manner of the second aspect, in a sixth possible implementation manner of the second aspect, the first information is an information element in the first information block or a second SIB, and the information element is at least one of a threshold parameter, an offset parameter, a quantity of levels of coverage enhancement supported by the base station, or a coverage enhancement amount corresponding to each coverage enhancement level, and the second SIB is any one of SIBs.

With reference to any one of the second aspect, or the first possible implementation manner of the second aspect to the sixth possible implementation manner of the second aspect, in a seventh possible implementation manner of the second aspect, the method further includes: determining, by the UE, an access requirement of the UE; and after the determining, by the UE, the capability of the base station according to the first information carried in the first information block and the determining, by the UE, an access requirement of the UE, the method further includes: determining, by the UE, whether the capability of the base station conforms to the access requirement of the UE; and accessing, by the UE, the base station if the capability of the base station conforms to the access requirement of the UE; or skipping, by the UE, accessing the base station if the capability of the base station does not conform to the access requirement of the UE.

With reference to the seventh possible implementation manner of the second aspect, in an eighth possible implementation manner of the second aspect, when the UE is the UE of the first type and the UE supports coverage enhancement, if a channel quality parameter is less than or equal to a preset threshold, the access requirement of the UE is: the base station supports access by the UE of the first type and the base station supports coverage enhancement; or if the channel quality parameter is greater than the preset threshold, the access requirement of the UE is: the base station supports access by the UE of the first type.

With reference to the seventh possible implementation manner of the second aspect, in a ninth possible implementation manner of the second aspect, when the UE is the UE of the first type and the UE does not support coverage enhancement, the access requirement of the UE is: the base station supports access by the UE of the first type.

With reference to the seventh possible implementation manner of the second aspect, in a tenth possible implementation manner of the second aspect, when the UE is not the UE of the first type and the UE supports coverage enhancement, if a channel quality parameter is less than or equal to a preset threshold, the access requirement of the UE is: the base station supports coverage enhancement.

With reference to any one of the second aspect or the first possible implementation manner of the second aspect to the tenth possible implementation manner of the second aspect, in an eleventh possible implementation manner of the second aspect, the UE of the first type is UE working at a specific frequency width of a carrier, and the specific frequency width is less than bandwidth of the carrier.

According to a third aspect, an embodiment of the present invention provides a base station, where the base station includes: a sending module, configured to send a first information block to UE, where the first information block carries first information, and the first information is used to indicate a capability of a base station, where the capability of the base station is: the base station does not support access by UE of a first type and the base station does not support coverage enhancement, or the base station supports access by the UE of the first type and the base station supports coverage enhancement, or the base station supports access by the UE of the first type and the base station does not support coverage enhancement, or the base station does not support access by the UE of the first type and the base station supports coverage enhancement; or the capability of the base station is: the base station does not send a first SIB, or the base station sends the first SIB, where the first SIB includes system information that at least one of the UE of the first type or UE supporting coverage enhancement needs to receive.

With reference to the third aspect, in a first possible implementation manner of the third aspect, if the first information is used to indicate that the sending module does not send the first SIB, the capability of the base station indicated by the first information is further: the base station does not support access by the UE of the first type and the base station does not support coverage enhancement; or if the first information is used to indicate that the sending module sends the first SIB, the capability of the base station indicated by the first information is further: the base station supports access by the UE of the first type and the base station supports coverage enhancement, or the base station supports access by the UE of the first type and the base station does not support coverage enhancement, or the base station does not support access by the UE of the first type and the base station supports coverage enhancement.

With reference to the first possible implementation manner of the third aspect, in a second possible implementation manner of the third aspect, the first SIB includes one SIB or two SIBs.

With reference to the third aspect, in a third possible implementation manner of the third aspect, if the first information indicates a degree of coverage enhancement supported by the base station, the capability of the base station indicated by the first information is: the base station supports access by the UE of the first type and the base station supports coverage enhancement, or the base station does not support access by the UE of the first type and the base station supports coverage enhancement.

With reference to the third aspect, the first possible implementation manner of the third aspect, and the second possible implementation manner of the third aspect, in a fourth possible implementation manner of the third aspect, the first information includes one bit, where one state of the one bit is used to indicate: the base station does not support access by the UE of the first type and the base station does not support coverage enhancement, and another state of the one bit is a reserved state; or one state of the bit is used to indicate: the base station does not support access by the UE of the first type and the base station does not support coverage enhancement, and another state of the one bit is used to indicate: the base station supports access by the UE of the first type and the base station supports coverage enhancement, or the base station supports access by the UE of the first type and the base station does not support coverage enhancement, or the base station does not support access by the UE of the first type and the base station supports coverage enhancement; or one state of the one bit is used to indicate: the base station does not send the first SIB; another state of the one bit is used to indicate: the base station sends the first SIB; or one state of the one bit is used to indicate: a degree of coverage enhancement supported by the base station, and another state of the one bit is a reserved state.

With reference to the third aspect and the first possible implementation manner of the third aspect to the fourth possible implementation manner of the third aspect, in a fifth possible implementation manner of the third aspect, the first information block is a MIB or is a first information block received when the UE accesses the base station.

With reference to the third possible implementation manner of the third aspect, in a sixth possible implementation manner of the third aspect, the first information is an information element in the first information block or a second SIB, and the information element is at least one of a threshold parameter, an offset parameter, a quantity of levels of coverage enhancement supported by the base station, or a coverage enhancement amount corresponding to each coverage enhancement level, and the second SIB is any one of SIBs.

With reference to any one of the third aspect or the first possible implementation manner of the third aspect to the sixth possible implementation manner of the third aspect, in a seventh possible implementation manner of the third aspect, the UE of the first type is UE working at a specific frequency width of a carrier, and the specific frequency width is less than bandwidth of the carrier.

According to a fourth aspect, an embodiment of the present invention provides UE, where the UE includes: an obtaining module, configured to obtain a first information block sent by a base station, where the first information block carries first information, and the first information is used to indicate a capability of the base station, where the capability of the base station is: the base station does not support access by UE of a first type and the base station does not support coverage enhancement, or the base station supports access by the UE of the first type and the base station supports coverage enhancement, or the base station supports access by the UE of the first type and the base station does not support coverage enhancement, or the base station does not support access by the UE of the first type and the base station supports coverage enhancement; or the capability of the base station is: the base station does not send a first SIB, or the base station sends the first SIB, where the first SIB includes system information that at least one of the UE of the first type or UE supporting coverage enhancement needs to receive; and a determining module, configured to determine the capability of the base station according to the first information carried in the first information block obtained by the obtaining module.

With reference to the fourth aspect, in a first possible implementation manner of the fourth aspect, if the first information is used to indicate that the base station does not send the first SIB, the capability of the base station indicated by the first information is further: the base station does not support access by the UE of the first type and the base station does not support coverage enhancement; or if the first information is used to indicate that the base station sends the first SIB, the capability of the base station indicated by the first information is further: the base station supports access by the UE of the first type and the base station supports coverage enhancement, or the base station supports access by the UE of the first type and the base station does not support coverage enhancement, or the base station does not support access by the UE of the first type and the base station supports coverage enhancement.

With reference to the first possible implementation manner of the fourth aspect, in a second possible implementation manner of the fourth aspect, the first SIB includes one SIB or two SIBs.

With reference to the fourth aspect, in a third possible implementation manner of the fourth aspect, if the first information indicates a degree of coverage enhancement supported by the base station, the capability of the base station indicated by the first information is: the base station supports access by the UE of the first type and the base station supports coverage enhancement, or the base station does not support access by the UE of the first type and the base station supports coverage enhancement.

With reference to the fourth aspect, the first possible implementation manner of the fourth aspect, or the second possible implementation manner of the fourth aspect, in a fourth possible implementation manner of the fourth aspect, the first information includes one bit, where one state of the one bit is used to indicate: the base station does not support access by the UE of the first type and the base station does not support coverage enhancement, and another state of the one bit is a reserved state; or one state of the bit is used to indicate: the base station does not support access by the UE of the first type and the base station does not support coverage enhancement, and another state of the one bit is used to indicate: the base station supports access by the UE of the first type and the base station supports coverage enhancement, or the base station supports access by the UE of the first type and the base station does not support coverage enhancement, or the base station does not support access by the UE of the first type and the base station supports coverage enhancement; or one state of the one bit is used to indicate: the base station does not send the first SIB; another state of the one bit is used to indicate: the base station sends the first SIB; or one state of the one bit is used to indicate: a degree of coverage enhancement supported by the base station, and another state of the one bit is a reserved state.

With reference to the fourth aspect and the first possible implementation manner of the fourth aspect to the fourth possible implementation manner of the fourth aspect, in a fifth possible implementation manner of the fourth aspect, the first information block is a MIB or is a first information block received when the UE accesses the base station.

With reference to the third possible implementation manner of the fourth aspect, in a sixth possible implementation manner of the fourth aspect, the first information is an information element in the first information block or a second SIB, and the information element is at least one of a threshold parameter, an offset parameter, a quantity of levels of coverage enhancement supported by the base station, or a coverage enhancement amount corresponding to each coverage enhancement level, and the second SIB is any one of SIBs.

With reference to any one of the fourth aspect, or the first possible implementation manner of the fourth aspect to the sixth possible implementation manner of the fourth aspect, in a seventh possible implementation manner of the fourth aspect, the determining module is further configured to determine an access requirement of the UE; and the UE further includes: a judging module, configured to determine whether the capability of the base station conforms to the access requirement of the UE; and an execution module, configured to: enable the UE to access the base station if the capability of the base station conforms to the access requirement of the UE; or enable the UE not to access the base station if the capability of the base station does not conform to the access requirement of the UE.

With reference to the seventh possible implementation manner of the fourth aspect, in an eighth possible implementation manner of the fourth aspect, when the UE is the UE of the first type and the UE supports coverage enhancement, if a channel quality parameter is less than or equal to a preset threshold, the access requirement of the UE is: the base station supports access by the UE of the first type and the base station supports coverage enhancement; or if the channel quality parameter is greater than the preset threshold, the access requirement of the UE is: the base station supports access by the UE of the first type.

With reference to the seventh possible implementation manner of the fourth aspect, in a ninth possible implementation manner of the fourth aspect, when the UE is the UE of the first type and the UE does not support coverage enhancement, the access requirement of the UE is: the base station supports access by the UE of the first type.

With reference to the seventh possible implementation manner of the fourth aspect, in a tenth possible implementation manner of the fourth aspect, when the UE is not the UE of the first type and the UE supports coverage enhancement, if a channel quality parameter is less than or equal to a preset threshold, the access requirement of the UE is: the base station supports coverage enhancement.

With reference to any one of the fourth aspect or the first possible implementation manner of the fourth aspect to the tenth possible implementation manner of the fourth aspect, in an eleventh possible implementation manner of the fourth aspect, the UE of the first type is UE working at a specific frequency width of a carrier, and the specific frequency width is less than bandwidth of the carrier.

The method for indicating a base station capability and the apparatus that are provided in the embodiments of the present invention include: sending, by a base station, a first information block to UE, where the first information block carries first information, and the first information is used to indicate a capability of the base station, where the capability of the base station is: the base station does not support access by UE of a first type and the base station does not support coverage enhancement, or the base station supports access by the UE of the first type and the base station supports coverage enhancement, or the base station supports access by the UE of the first type and the base station does not support coverage enhancement, or the base station does not support access by the UE of the first type and the base station supports coverage enhancement.

Based on the description of the foregoing embodiments, by means of the method for indicating a base station capability and the apparatus that are provided in the embodiments of the present invention, a base station sends first information block to UE, the first information block carries first information, and the first information is used to indicate a capability of the base station, so as to indicate whether the base station supports UE of a first type or a capability of coverage enhancement, so that the UE accesses the base station only when a requirement of the UE conforms to a capability supported by the base station, reducing power consumption of the UE of the first type.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present embodiments.

Embodiment 1

Figure 1:
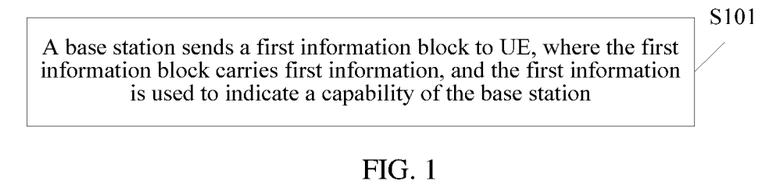
FIG. 1 is a schematic flowchart 1 of a method for indicating a base station capability according to an embodiment of the present invention.

An embodiment of the present invention provides a method for indicating a base station capability. As shown in FIG. 1, the method includes.

S101: A base station sends a first information block to a user equipment (UE), where the first information block carries first information, and the first information is used to indicate a capability of the base station.

The capability of the base station is: the base station does not support access by UE of a first type and the base station does not support coverage enhancement, or the base station supports access by the UE of the first type and the base station supports coverage enhancement, or the base station supports access by the UE of the first type and the base station does not support coverage enhancement, or the base station does not support access by the UE of the first type and the base station supports coverage enhancement.

Alternatively, the capability of the base station is: the base station does not send a first system information block (SIB), or the base station sends the first SIB, where the first SIB includes system information that at least one of the UE of the first type or UE supporting coverage enhancement needs to receive.

The UE of the first type is UE working at a specific frequency width of a carrier, and the specific frequency width is less than bandwidth of the carrier. The first information block is a MIB or is a first information block received when the UE accesses the base station. In an existing long term evolution (LTE) system, the first information block received when the UE accesses the base station is the master information block (MIB).

The base station sends the first information block to the UE, where the first information block carries the first information, and the first information is used to indicate the capability of the base station. Specifically, description in which the first information block is the MIB is provided. In the MIB, one bit carries the first information. One state of the one bit is used to indicate: the base station does not support access by the UE of the first type and the base station does not support coverage enhancement, and another state of the one bit is a reserved state; or one state of the bit is used to indicate: the base station does not support access by the UE of the first type and the base station does not support coverage enhancement, and another state of the one bit is used to indicate: the base station supports access by the UE of the first type and the base station supports coverage enhancement, or the base station supports access by the UE of the first type and the base station does not support coverage enhancement, or the base station does not support access by the UE of the first type and the base station supports coverage enhancement.

For example, when information in one bit in the MIB is 0, it indicates that the base station does not support access by the UE of the first type and the base station does not support coverage enhancement, and when information in one bit in the MIB is 1, it indicates that the base station supports access by the UE of the first type and the base station supports coverage enhancement, the base station supports access by the UE of the first type and the base station does not support coverage enhancement, or the base station does not support access by the UE of the first type and the base station supports coverage enhancement. It can be understood that when the UE of the first type receives the MIB sent by the base station, and one bit preset in the MIB is 0, the UE of the first type does not access the base station, so as to reduce power consumption brought by blindly trying, by the UE, to access the first type to the base station. When the UE of the first type receives the MIB of the base station, and one bit preset in the MIB is 1, if that the bit is 1 is defined to indicate that the base station supports the UE of the first type and supports coverage enhancement, the UE of the first type accesses the base station. If that the bit is 1 is defined to indicate that the base station supports the UE of the first type and does not support coverage enhancement, or indicate that the base station does not support the UE of the first type and supports coverage enhancement, the UE of the first type determines whether a requirement of the UE is the same as a capability provided by the base station. If the requirement of the UE is the same as a capability provided by the base station, the UE of the first type accesses the base station. If the requirement of the UE is not the same as a capability provided by the base station, the UE of the first type does not access the base station. It should also be mentioned that if the UE of the first type cannot determine, according to information in one bit in the MIB, whether the capability provided by the base station is the same as the requirement of the UE, the UE of the first type tries to access the base station. For example, when that one bit preset in the MIB is 1 indicates that the base station supports at least one of the UE of the first type or coverage enhancement, and the requirement of the UE of the first type is coverage enhancement, the UE of the first type cannot determine, according to an indication of the information in one bit in the MIB, whether the base station supports coverage enhancement. Therefore, the UE of the first type tries to access the base station to perform communication.

It can be understood that when a bit in the MIB is 0 or 1, indicated information is preset. Specifically, which information that the bit in the MIB is 0 or 1 separately indicates is not limited in the present embodiments.

Further for example, the first information is used to indicate that the base station does not send a first system information block (SIB), or the base station sends the first SIB, where the first SIB includes system information that at least one of the UE of the first type or UE supporting coverage enhancement needs to receive.

For example, if the first information indicates that the base station does not send the first SIB, the capability of the base station indicated by the first information is further: the base station does not support access by the UE of the first type and the base station does not support coverage enhancement; or if the first information indicates that the base station sends the first SIB, the capability of the base station indicated by the first information is further: the base station supports access by the UE of the first type and the base station supports coverage enhancement, or the base station supports access by the UE of the first type and the base station does not support coverage enhancement, or the base station does not support access by the UE of the first type and the base station supports coverage enhancement.

The first SIB includes one SIB or two SIBs.

For example, the first SIB includes one SIB, and the one SIB may be a machine type communication SIB. The machine type communication SIB is used to configure system information shared by the UE of the first type and coverage enhancement of the base station. In a case in which the machine type communication SIB can be applied to normal system coverage, both the UE of the first type and UE of another type can receive the machine type communication SIB and a coverage enhancement SIB.

For example, when one bit in the MIB is 0, it indicates that the base station does not send the machine type communication SIB. When one bit in the MIB is 1, it indicates that the base station sends the machine type communication SIB. Whether the base station sends the machine type communication SIB is associated with the base station capability. If the base station does not send the machine type communication SIB, it indicates that the base station does not support low-complexity UE and does not support coverage enhancement. If the base station sends the machine type communication SIB, it indicates that the base station supports low-complexity UE or indicates that the base station supports low-complexity UE and supports coverage enhancement.

For example, that the first SIB includes two SIBs is: the first SIB may be a machine type communication SIB and a coverage enhancement SIB. The coverage enhancement SIB is used to configure extra system information required by coverage enhancement of the system. The coverage enhancement SIB is used for coverage enhancement of the system. Both the UE of the first type and UE of another type can receive the coverage enhancement SIB.

Further for example, information in two bits in the MIB is used to indicate whether the base station sends the machine type communication SIB and sends the coverage enhancement SIB. The two bits in the MIB may be bits in ten reserved bits in an existing MIB. Specifically, the two bits in the MIB are separately marked as b0 and b1. There are several indication methods shown in Table 1, Table 2, Table 3, and Table 4 for b0 and b1 to indicate whether the base station sends the machine type communication SIB and sends the coverage enhancement SIB, and a capability of the base station represented by each indication manner is shown as well. Which one of b0 and b1 is a high-order bit is not limited in this embodiment of the present invention.

TABLE 1

| Values of b0 and b1 | Whether a base station sends a machine type communication SIB and a coverage enhancement SIB | Capability of a base station |
| --- | --- | --- |
| b0 = 0 | Not sending a machine type communication SIB | Not supporting low-complexity UE and not supporting coverage enhancement |
| b0 = 1 | Sending a machine type communication SIB | Supporting low-complexity UE |
| b1 = 0 | Not sending a coverage enhancement SIB | Not supporting coverage enhancement |
| b1 = 1 | Sending a coverage enhancement SIB | Supporting coverage enhancement |

TABLE 2

| Values of b0 and b1 | Whether a base station sends a machine type communication SIB and a coverage enhancement SIB | Capability of a base station |
| --- | --- | --- |
| b0 = 0 | Not sending a machine type communication SIB | Not supporting low-complexity UE |
| b0 = 1 | Sending a machine type communication SIB | Supporting low-complexity UE |
| b1 = 0 | Not sending a coverage enhancement SIB | Not supporting coverage enhancement |
| b1 = 1 | Sending a coverage enhancement SIB | Supporting coverage enhancement |

TABLE 3

| Values of b0 and b1 | Whether a base station sends a machine type communication SIB and a coverage enhancement SIB | Capability of a base station |
| --- | --- | --- |
| b1, b0 = 00 | Not sending a machine type communication SIB and not sending a coverage enhancement SIB | Not supporting low-complexity UE and not supporting coverage enhancement |
| b1, b0 = 01 | Sending a machine type communication SIB and not | Supporting low-complexity UE and not supporting |

TABLE 3-continued

| Values of b0 and b1 | Whether a base station sends a machine type communication SIB and a coverage enhancement SIB | Capability of a base station |
|---|---|---|
| b1, b0 = 10 | Reserved (no meaning) | Reserved |
| b1, b0 = 11 | Sending a machine type communication SIB and sending a coverage enhancement SIB | Supporting low-complexity UE and coverage enhancement |

TABLE 4

| Values of b0 and b1 | Whether a base station sends a machine type communication SIB and a coverage enhancement SIB | Capability of a base station |
|---|---|---|
| b1, b0 = 00 | Not sending a machine type communication SIB and not sending a coverage enhancement SIB | Not supporting low-complexity UE and not supporting coverage enhancement |
| b1, b0 = 01 | Sending a machine type communication SIB | Supporting low-complexity UE |
| b1, b0 = 10 | Reserved (no meaning) | Reserved |
| b1, b0 = 11 | Sending a machine type communication SIB and sending a coverage enhancement SIB | Supporting low-complexity UE and coverage enhancement |

Further For example, if the first information indicates a degree of coverage enhancement supported by the base station, the capability of the base station indicated by the first information is: the base station supports access by the UE of the first type and the base station supports coverage enhancement, or the base station does not support access by the UE of the first type and the base station supports coverage enhancement.

If the first information indicates a degree of coverage enhancement supported by the base station, the first information is an information element in the first information block or a second SIB, and the second SIB is any one of SIBs.

The information element is at least one of a threshold parameter, an offset parameter, a quantity of levels of coverage enhancement supported by the base station, or a coverage enhancement amount corresponding to each coverage enhancement level.

For example, the MIB or the SIB sent by the base station includes a bit, a domain, or an information element that indicates the threshold parameter. The UE determines, according to the threshold parameter, whether to access the base station. When a parameter indicating channel quality of the UE is greater than or equal to (or greater than) the threshold parameter, the UE accesses the base station. Otherwise, the UE does not access the base station.

Alternatively, the MIB or the SIB sent by the base station includes a bit, a domain, or an information element that indicates the threshold parameter and the offset parameter. The UE determines, according to the threshold parameter and the offset parameter, whether to access the base station. When a parameter indicating channel quality of the UE is greater than or equal to (or greater than) a sum (or a difference) of the threshold parameter and the offset parameter, the UE accesses the base station. Otherwise, the UE does not access the base station.

Alternatively, the MIB or the SIB sent by the base station includes a quantity of levels of coverage enhancement supported by the base station, a step length corresponding to each coverage enhancement level, at least one of a bit, a domain, or an information element in the offset parameter. The step lengths corresponding to the coverage enhancement levels may be same or may not be same.

The UE determines, according to at least one of the quantity of levels of coverage enhancement supported by the base station, the step length corresponding to each coverage enhancement levels, or the offset parameter, whether to access the base station. The UE can determine the degree of coverage enhancement supported by the base station according to at least one of the quantity of levels of coverage enhancement supported by the base station, the step length corresponding to each coverage enhancement level, or the offset parameter. The degree of coverage enhancement supported by the base station is indicated by a range or a maximum value of parameters that indicate channel quality and that are supported by the base station. When the parameter indicating channel quality of the UE is within the range of the parameters that indicate channel quality and that are supported by the base station or is less than or equal to the maximum value of the parameters that indicate channel quality and that are supported by the base station, the UE accesses the base station. Otherwise, the UE does not access the base station.

For example, when the parameter indicating channel quality is a coverage enhancement value required by a physical uplink shared channel (PUSCH), the quantity of levels of coverage enhancement supported by the base station is 3, the step length corresponding to each coverage enhancement level is 5 dB, and the offset parameter is 3 dB. Low-complexity UE determines that the maximum value of the channel quality parameters supported by the base station is: the quantity of levels of coverage enhancement supported by the base station 3×the step length corresponding to each coverage enhancement level 5+ the offset parameter 3=18 dB. If a coverage enhancement value required by a PUSCH of the low-complexity UE is greater than 18 dB, the UE does not access the base station. Normal UE determines that the maximum value of the channel quality parameters supported by the base station is: the quantity of levels of coverage enhancement supported by the base station 3*the step length corresponding to each coverage enhancement level 5=15 dB. If a coverage enhancement value required by a PUSCH of the normal UE is greater than 15 dB, the UE does not access the base station.

The SIB in this embodiment is at least one of an SIB 1 to an SIB 17 that are supported by a base station in an existing LTE system, a new SIB type, a machine type communication SIB, or a coverage enhancement SIB.

In the technical solution provided in this embodiment of the present invention, the base station capability is indicated in the MIB, so that the UE knows whether the base station sends the first SIB, avoiding blind detection of the first SIB and reducing power consumption of the UE. In the solution of Embodiment 1 of the present invention, that the system does not support low-complexity UE and does not support coverage enhancement is directly or indirectly indicated by using one bit in the MIB, reducing bit overheads in the MIB.

The UE can determine a degree of coverage enhancement supported by the system and determines, according to the degree of coverage enhancement supported by the system, whether to access the system. This avoids power waste of trying, by the UE, to access the system due to that the degree of coverage enhancement supported by the system actually cannot reach the requirement of the UE. A problem is further avoided that if information received by the UE only indicates that the system does not support coverage enhancement, the UE does not access the system, but actually, the UE may also access the system after several times of trying, and the UE cannot well obtain a service provided by the system if the UE does not access the system.

The method for indicating a base station capability provided in this embodiment of the present invention includes: sending, by a base station, a first information block to UE, where the first information block carries first information, and the first information is used to indicate a capability of the base station, where the capability of the base station is: the base station does not support access by UE of a first type and the base station does not support coverage enhancement, or the base station supports access by the UE of the first type and the base station supports coverage enhancement, or the base station supports access by the UE of the first type and the base station does not support coverage enhancement, or the base station does not support access by the UE of the first type and the base station supports coverage enhancement.

Based on the description of the foregoing embodiment, by means of the method for indicating a base station capability provided in this embodiment of the present invention, a base station sends first information block to UE, the first information block carries first information, and the first information is used to indicate a capability of the base station, so as to indicate whether the base station supports UE of a first type or a capability of coverage enhancement, so that the UE accesses the base station only when the requirement of the UE conforms to a capability supported by the base station, reducing power consumption of the UE of the first type.

Embodiment 2

Figure 2:
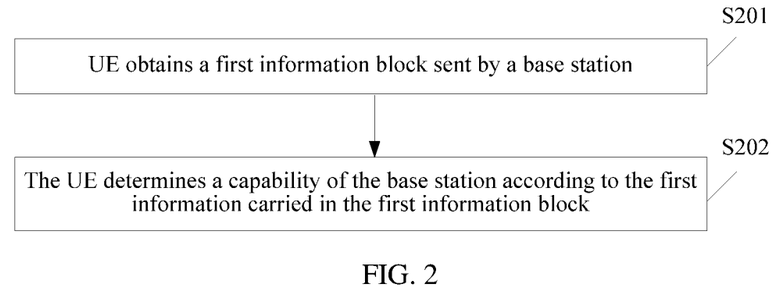
FIG. 2 is a schematic flowchart 2 of a method for indicating a base station capability according to an embodiment of the present invention.

An embodiment of the present invention further provides a method for indicating a base station capability. As shown in FIG. 2, FIG. 2 is a schematic flowchart of the method. The method includes the following steps.

S201: UE obtains a first information block sent by a base station.

The first information block carries first information, and the first information is used to indicate a capability of the base station. The capability of the base station is: the base station does not support access by UE of a first type and the base station does not support coverage enhancement, or the base station supports access by the UE of the first type and the base station supports coverage enhancement, or the base station supports access by the UE of the first type and the base station does not support coverage enhancement, or the base station does not support access by the UE of the first type and the base station supports coverage enhancement.

The UE of the first type is UE working at a specific frequency width of a carrier, and the specific frequency width is less than bandwidth of the carrier. The first information block is a MIB or is a first information block received when the UE accesses the base station. In an existing LTE system, the first information block received when the UE accesses the base station is the MIB.

Alternatively, the capability of the base station is: the base station does not send a first SIB, or the base station sends the first SIB, where the first SIB includes system information that at least one of the UE of the first type or UE supporting coverage enhancement needs to receive.

The UE receives the first information block sent by the base station, where the first information block carries the first information, and the first information is used to indicate the capability of the base station. Specifically, description in which the first information block is the MIB is provided. In the MIB, one bit carries the first information. One state of the one bit is used to indicate: the base station does not support access by the UE of the first type and the base station does not support coverage enhancement, and another state of the one bit is a reserved state (that is, another state of the bit does not indicate any information); or one state of the bit is used to indicate: the base station does not support access by the UE of the first type and the base station does not support coverage enhancement, and another state of the one bit is used to indicate: the base station supports access by the UE of the first type and the base station supports coverage enhancement, or the base station supports access by the UE of the first type and the base station does not support coverage enhancement, or the base station does not support access by the UE of the first type and the base station supports coverage enhancement.

It should be noted that if the first information indicates a degree of coverage enhancement supported by the base station, the first information is an information element in the first information block or a second SIB. The information element is at least one of a threshold parameter, an offset parameter, a quantity of levels of coverage enhancement supported by the base station, or a coverage enhancement amount corresponding to each coverage enhancement level.

Specifically, how the first information indicates the capability of the base station is the same as description in the foregoing embodiment and is not described in detail again herein.

S202: The UE determines a capability of the base station according to the first information carried in the first information block.

Figure 3:
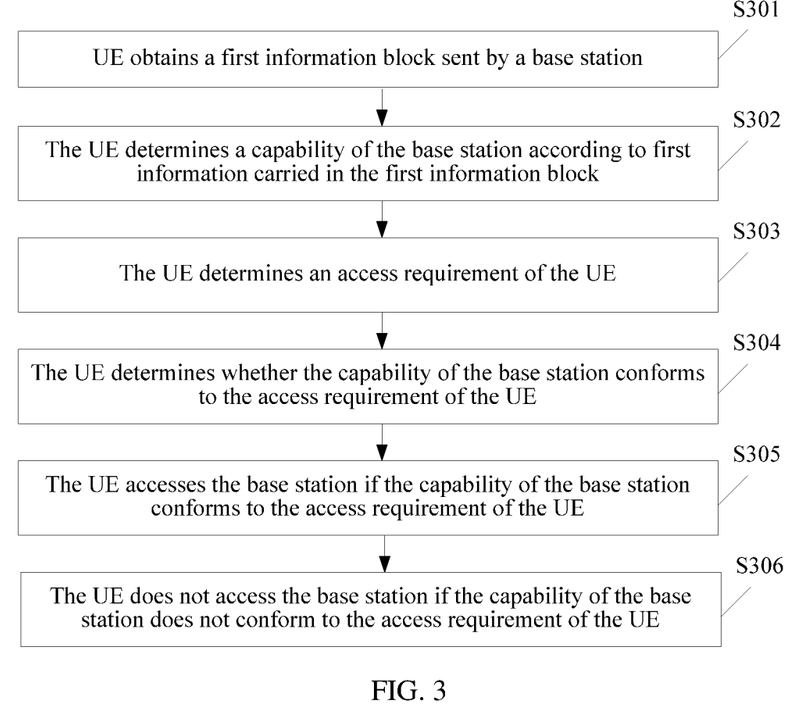
FIG. 3 is a schematic flowchart 3 of a method for indicating a base station capability according to an embodiment of the present invention.

As shown in FIG. 3, an embodiment of the present invention further provides another method for indicating a base station capability. The method includes the following steps.

S301: UE obtains a first information block sent by a base station.

S302: The UE determines a capability of the base station according to first information carried in the first information block.

S303: The UE determines an access requirement of the UE.

When the UE is the UE of the first type and the UE supports coverage enhancement, if a channel quality parameter is less than or equal to a preset threshold, the access requirement of the UE is: the base station supports access by the UE of the first type and the base station supports coverage enhancement; or if the channel quality parameter is greater than the preset threshold, the access requirement of the UE is: the base station supports access by the UE of the first type.

When the UE is the UE of the first type and the UE does not support coverage enhancement, the access requirement of the UE is: the base station supports access by the UE of the first type.

When the UE is not the UE of the first type and the UE supports coverage enhancement, if a channel quality parameter is less than or equal to a preset threshold, the access requirement of the UE is: the base station supports coverage enhancement.

The parameter indicating channel quality includes at least one of: reference signal receive power, a reference signal receive quality, a channel quality indication, a coverage enhancement value required by a restricted channel, a coverage enhancement value required by a PUSCH, a coverage enhancement level, a repetition level, times of combination for primary synchronization signal receiving, times of combination for secondary synchronization signal receiving, times of combination for MIB receiving, times of trying for primary synchronization signal receiving, times of trying for secondary synchronization signal receiving, times of trying for MIB receiving, a signal time length for primary synchronization signal receiving, a signal time length for secondary synchronization signal receiving, or a signal time length for MIB receiving.

It should be mentioned that S302 and S303 do not have a sequence.

S304: The UE determines whether the capability of the base station conforms to the access requirement of the UE.

S305: The UE accesses the base station if the capability of the base station conforms to the access requirement of the UE.

S306: The UE does not access the base station if the capability of the base station does not conform to the access requirement of the UE.

The MIB or the SIB sent by the base station includes a bit, a domain, or an information element that indicates the threshold parameter. The UE determines, according to the threshold parameter, whether to access the base station. When a parameter indicating channel quality of the UE is greater than or equal to (or greater than) the threshold parameter, the UE accesses the base station. Otherwise, the UE does not access the base station. Alternatively, the MIB or the SIB sent by the base station includes a bit, a domain, or an information element that indicates the threshold parameter and the offset parameter. The UE determines, according to the threshold parameter and the offset parameter, whether to access the base station. When a parameter indicating channel quality of the UE is greater than or equal to (or greater than) a sum (or a difference) of the threshold parameter and the offset parameter, the UE accesses the base station. Otherwise, the UE does not access the base station. Alternatively, the MIB or the SIB sent by the base station includes a quantity of levels of coverage enhancement supported by the base station, a step length corresponding to each coverage enhancement level, at least one of a bit, a domain, or an information element in the offset parameter. The step lengths corresponding to the coverage enhancement levels may be same or may not be same.

The UE determines, according to at least one of the quantity of levels of coverage enhancement supported by the base station, the step length corresponding to each coverage enhancement levels, or the offset parameter, whether to access the base station. The UE can determine the degree of coverage enhancement supported by the base station according to at least one of the quantity of levels of coverage enhancement supported by the base station, the step length corresponding to each coverage enhancement level, or the offset parameter. The degree of coverage enhancement supported by the base station is indicated by a range or a maximum value of parameters that indicate channel quality and that are supported by the base station. When the parameter indicating channel quality of the UE is within the range of the parameters that indicate channel quality and that are supported by the base station or is less than or equal to the maximum value of the parameters that indicate channel quality and that are supported by the base station, the UE accesses the base station. Otherwise, the UE does not access the base station.

In this embodiment, when the parameter indicating channel quality is a coverage enhancement value required by a PUSCH, the quantity of levels of coverage enhancement supported by the base station is 3, the step length corresponding to each coverage enhancement level is 5 dB, and the offset parameter is 3 dB. Low-complexity UE determines that the maximum value of the channel quality parameters supported by the base station is: the quantity of levels of coverage enhancement supported by the base station 3×the step length corresponding to each coverage enhancement level 5+ the offset parameter 3=18 dB. If a coverage enhancement value required by a PUSCH of the low-complexity UE is greater than 18 dB, the UE does not access the base station. Normal UE determines that the maximum value of the channel quality parameters supported by the base station is: the quantity of levels of coverage enhancement supported by the base station 3* the step length corresponding to each coverage enhancement level 5=15 dB. If a coverage enhancement value required by a PUSCH of the normal UE is greater than 15 dB, the UE stops accessing the base station.

The SIB in this embodiment is at least one of an SIB 1 to an SIB 17 that are supported by an existing LTE system, a new SIB type, a machine type communication SIB, or a coverage enhancement SIB.

In the technical solution provided in this embodiment of the present invention, the base station capability is indicated in the MIB, so that the UE knows whether the base station sends the first SIB, avoiding blind detection of the first SIB and reducing power consumption of the UE. In the solution of Embodiment 1 of the present invention, that the system does not support low-complexity UE and does not support coverage enhancement is directly or indirectly indicated by using one bit in the MIB, reducing bit overheads in the MIB.

The UE can determine a degree of coverage enhancement supported by the system and determines, according to the degree of coverage enhancement supported by the system, whether to access the system. This avoids power waste of trying, by the UE, to access the system due to that the degree of coverage enhancement supported by the system actually cannot reach the requirement of the UE. A problem is further avoided that if information received by the UE only indicates that the system does not support coverage enhancement, the UE does not access the system, but actually, the UE may also access the system after several times of trying, and the UE cannot well obtain a service provided by the system if the UE does not access the system.

The method for indicating a base station capability provided in this embodiment of the present invention includes: obtaining, by UE, a first information block sent by a base station, where the first information block carries first information, and the first information is used to indicate a capability of the base station, where the capability of the base station is: the base station does not support access by UE of a first type and the base station does not support coverage enhancement, or the base station supports access by the UE of the first type and the base station supports coverage enhancement, or the base station supports access by the UE of the first type and the base station does not support coverage enhancement, or the base station does not support access by the UE of the first type and the base station supports coverage enhancement.

Based on the description of the foregoing embodiment, by means of the method for indicating a base station capability provided in this embodiment of the present invention, UE obtains a first information block sent by a base station, the first information block carries first information, and the first information is used to indicate a capability of the base station, so as to indicate whether the base station supports UE of a first type or a capability of coverage enhancement, so that the UE accesses the base station only when the requirement of the UE conforms to a capability supported by the base station, reducing power consumption of the UE of the first type.

Embodiment 3

Figure 4:
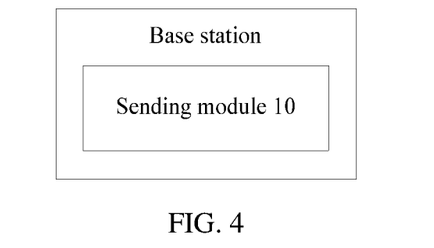
FIG. 4 is a schematic structural diagram of a base station according to an embodiment of the present invention.

An embodiment of the present invention provides a base station. As shown in FIG. 4, the base station includes: a sending module 10, configured to send a first information block to UE, where the first information block carries first information, and the first information is used to indicate a capability of a base station. The capability of the base station is: the base station does not support access by UE of a first type and the base station does not support coverage enhancement, or the base station supports access by the UE of the first type and the base station supports coverage enhancement, or the base station supports access by the UE of the first type and the base station does not support coverage enhancement, or the base station does not support access by the UE of the first type and the base station supports coverage enhancement; or the capability of the base station is: the base station does not send a first SIB, or the base station sends the first SIB, where the first SIB includes system information that at least one of the UE of the first type or UE supporting coverage enhancement needs to receive.

If the first information is used to indicate that the sending module does not send the first SIB, the capability of the base station indicated by the first information is further: the base station does not support access by the UE of the first type and the base station does not support coverage enhancement; or if the first information indicates that the sending module sends the first SIB, the capability of the base station indicated by the first information is further: the base station supports access by the UE of the first type and the base station supports coverage enhancement, or the base station supports access by the UE of the first type and the base station does not support coverage enhancement, or the base station does not support access by the UE of the first type and the base station supports coverage enhancement.

The first SIB includes one SIB or two SIBs.

If the first information indicates a degree of coverage enhancement supported by the base station, the capability of the base station indicated by the first information is: the base station supports access by the UE of the first type and the base station supports coverage enhancement, or the base station does not support access by the UE of the first type and the base station supports coverage enhancement.

The first information includes one bit, where one state of the one bit is used to indicate: the base station does not support access by the UE of the first type and the base station does not support coverage enhancement, and another state of the one bit is a reserved state.

Alternatively, one state of the bit is used to indicate: the base station does not support access by the UE of the first type and the base station does not support coverage enhancement, and another state of the one bit is used to indicate: the base station supports access by the UE of the first type and the base station supports coverage enhancement, or the base station supports access by the UE of the first type and the base station does not support coverage enhancement, or the base station does not support access by the UE of the first type and the base station supports coverage enhancement.

Alternatively, one state of the one bit is used to indicate: the base station does not send the first SIB; another state of the one bit is used to indicate: the base station sends the first SIB.

Alternatively, one state of the one bit is used to indicate: a degree of coverage enhancement supported by the base station, and another state of the one bit is a reserved state.

The first information block is a master information block (MIB) or is a first information block received when the UE accesses the base station.

The first information is an information element in the first information block or a second SIB, and the information element is at least one of a threshold parameter, an offset parameter, a quantity of levels of coverage enhancement supported by the base station, or a coverage enhancement amount corresponding to each coverage enhancement level, and the second SIB is any one of SIBs.

The UE of the first type is UE working at a specific frequency width of a carrier, and the specific frequency width is less than bandwidth of the carrier.

The base station provided in this embodiment of the present invention includes: a sending module, configured to send a first information block to UE, where the first information block carries first information, and the first information is used to indicate a capability of the base station, where the capability of the base station is: the base station does not support access by UE of a first type and the base station does not support coverage enhancement, or the base station supports access by the UE of the first type and the base station supports coverage enhancement, or the base station supports access by the UE of the first type and the base station does not support coverage enhancement, or the base station does not support access by the UE of the first type and the base station supports coverage enhancement.

Based on the description of the foregoing embodiment, by means of the base station provided in this embodiment of the present invention, a sending module sends first information block to UE, the first information block carries first information, and the first information is used to indicate a capability of the base station, so as to indicate whether the base station supports UE of a first type or a capability of coverage enhancement, so that the UE accesses the base station only when a requirement of the UE conforms to a capability supported by the base station, reducing power consumption of the UE of the first type.

Embodiment 4

Figure 5:
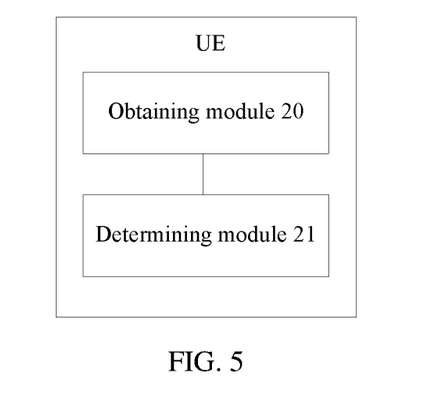
FIG. 5 is a schematic structural diagram 1 of UE according to an embodiment of the present invention.

An embodiment of the present invention provides UE. As shown in FIG. 5, FIG. 5 is a schematic structural diagram of the UE. The UE includes: an obtaining module 20, configured to obtain a first information block sent by a base station, where the first information block carries first information, and the first information is used to indicate a capability of the base station, where the capability of the base station is: the base station does not support access by UE of a first type and the base station does not support coverage enhancement, or the base station supports access by the UE of the first type and the base station supports coverage enhancement, or the base station supports access by the UE of the first type and the base station does not support coverage enhancement, or the base station does not support access by the UE of the first type and the base station supports coverage enhancement; or the capability of the base station is: the base station does not send a first SIB, or the base station sends the first SIB, where the first SIB includes system information that at least one of the UE of the first type or UE supporting coverage enhancement needs to receive; and a determining module 21, configured to determine the capability of the base station according to the first information carried in the first information block obtained by the obtaining module.

If the first information is used to indicate that the base station does not send the first SIB, the capability of the base station indicated by the first information is further: the base station does not support access by the UE of the first type and the base station does not support coverage enhancement; or if the first information is used to indicate that the base station sends the first SIB, the capability of the base station indicated by the first information is further: the base station supports access by the UE of the first type and the base station supports coverage enhancement, or the base station supports access by the UE of the first type and the base station does not support coverage enhancement, or the base station does not support access by the UE of the first type and the base station supports coverage enhancement.

The first SIB includes one SIB or two SIBs.

If the first information indicates a degree of coverage enhancement supported by the base station, the capability of the base station indicated by the first information is: the base station supports access by the UE of the first type and the base station supports coverage enhancement, or the base station does not support access by the UE of the first type and the base station supports coverage enhancement.

The first information includes one bit, where one state of the one bit is used to indicate: the base station does not support access by the UE of the first type and the base station does not support coverage enhancement, and another state of the one bit is a reserved state.

Alternatively, one state of the bit is used to indicate: the base station does not support access by the UE of the first type and the base station does not support coverage enhancement, and another state of the one bit is used to indicate: the base station supports access by the UE of the first type and the base station supports coverage enhancement, or the base station supports access by the UE of the first type and the base station does not support coverage enhancement, or the base station does not support access by the UE of the first type and the base station supports coverage enhancement.

Alternatively, one state of the one bit is used to indicate: the base station does not send the first SIB; another state of the one bit is used to indicate: the base station sends the first SIB.

Alternatively, one state of the one bit is used to indicate: a degree of coverage enhancement supported by the base station, and another state of the one bit is a reserved state.

The first information block is a MIB or is a first information block received when the UE accesses the base station.

The first information is an information element in the first information block or a second SIB, and the information element is at least one of a threshold parameter, an offset parameter, a quantity of levels of coverage enhancement supported by the base station, or a coverage enhancement amount corresponding to each coverage enhancement level, and the second SIB is any one of SIBs.

Figure 6:
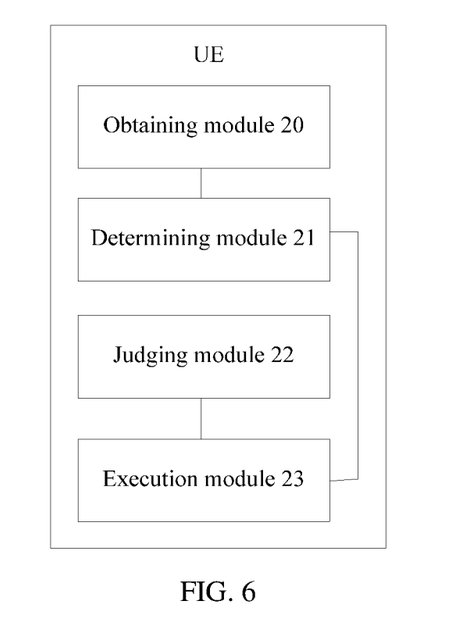
FIG. 6 is a schematic structural diagram 2 of UE according to an embodiment of the present invention.

As shown in FIG. 6, the UE further includes: the determining module 21, further configured to determine an access requirement of the UE.

The UE further includes: a judging module 22, configured to determine whether the capability of the base station conforms to the access requirement of the UE; and an execution module 23, configured to: enable the UE to access the base station if the capability of the base station conforms to the access requirement of the UE; or enable the UE not to access the base station if the capability of the base station does not conform to the access requirement of the UE.

When the UE is the UE of the first type and the UE supports coverage enhancement, if a channel quality parameter is less than or equal to a preset threshold, the access requirement of the UE is: the base station supports access by the UE of the first type and the base station supports coverage enhancement; or if the channel quality parameter is greater than the preset threshold, the access requirement of the UE is: the base station supports access by the UE of the first type.

When the UE is the UE of the first type and the UE does not support coverage enhancement, the access requirement of the UE is: the base station supports access by the UE of the first type.

When the UE is not the UE of the first type and the UE supports coverage enhancement, if a channel quality parameter is less than or equal to a preset threshold, the access requirement of the UE is: the base station supports coverage enhancement.

The UE of the first type is UE working at a specific frequency width of a carrier, and the specific frequency width is less than bandwidth of the carrier.

The UE provided in this embodiment of the present invention includes: the obtaining module, configured to obtain a first information block sent by a base station, where the first information block carries first information, and the first information is used to indicate a capability of the base station, where the capability of the base station is: the base station does not support access by UE of a first type and the base station does not support coverage enhancement, or the base station supports access by the UE of the first type and the base station supports coverage enhancement, or the base station supports access by the UE of the first type and the base station does not support coverage enhancement, or the base station does not support access by the UE of the first type and the base station supports coverage enhancement; and the determining module, configured to determine the capability of the base station according to the first information carried in the first information block obtained by the obtaining module.

Based on the description of the foregoing embodiment, by means of the UE provided in this embodiment of the present invention, an obtaining module obtains first information block sent by a base station, the first information block carries first information, and the first information is used to indicate a capability of the base station, so as to indicate whether the base station supports UE of a first type or a capability of coverage enhancement, so that the UE accesses the base station only when a requirement of the UE conforms to a capability supported by the base station, reducing power consumption of the UE of the first type.

The foregoing descriptions are merely specific implementation manners of the present embodiments, but are not intended to limit the protection scope of the present embodiments. Any variation or replacement readily figured out by a person skilled in the art within the technical scope disclosed in the present embodiments shall fall within the protection scope of the present embodiments. Therefore, the protection scope of the present embodiments shall be subject to the protection scope of the claims.

What is claimed is:

1. A method comprising:
sending, by a base station, a master information block (MIB) to a first user equipment (UE), wherein the base station does not support access of either of a first type of UE or a second type of UE, the MIB carries information indicating that a system information block (SIB) is not sent from the base station to the first UE, the SIB is usable for configuring system information shared by the first type of UE and the second type of UE, wherein the first type of UE is a type of UE which works at a specific frequency width of a carrier, and the specific frequency width is less than a bandwidth of the carrier, and the second type of UE is a type of UE which supports coverage enhancement.

2. The method according to claim 1, wherein the information is one bit, a first state of the one bit indicates that the SIB is not sent from the base station, and a second state of the one bit indicates that the SIB is sent from the base station.

3. The method according to claim 1, wherein the information further indicates that the base station does not support access of the first type of UE and the second type of UE.

4. A method comprising:
obtaining, by a first user equipment (UE), a master information block (MIB) from a base station, wherein the MIB carries information indicating that a system information block (SIB) is not sent from the base station to the first UE, wherein the SIB is usable for configuring system information shared by a first type of UE and a second type of UE, wherein the first UE is the first type of UE or the second type of UE; and
determining, by the first UE according to the information carried in the MIB, that the base station does not support access of the first type of UE or the second type of UE, wherein the first type of UE is a type of UE which works at a specific frequency width of a carrier, and the specific frequency width is less than a bandwidth of the carrier, and the second type of UE is a type of UE which supports coverage enhancement.

5. The method according to claim 4, wherein the information is one bit, a first state of the one bit indicates that the SIB is not sent from the base station, and a second state of the one bit indicates that the SIB is sent from the base station.

6. The method according to claim 4, wherein the information further indicates that the base station does not support access of the first type of UE and the second type of UE.

7. An apparatus, comprising a processor and a non-transitory storage medium storing executable instructions, wherein the instructions, when executed by the processor, cause the apparatus to:
send a master information block (MIB) to a first user equipment (UE), wherein the apparatus does not support access of either of a first type UE or a second type UE, the MIB carries information indicating that a system information block (SIB) is not sent from the apparatus to the first UE, wherein the SIB is usable for configuring system information shared by the first type of UE and the second type of UE, wherein the first type of UE is a type of UE which works at a specific frequency width of a carrier, and the specific frequency width is less than bandwidth of the carrier, and the second type of UE is a type of UE which supports coverage enhancement.

8. The apparatus according to claim 7, wherein the information is one bit, a first state of the one bit indicates that the SIB is not sent from the apparatus, and a second state of the one bit indicates that the SIB is sent from the apparatus.

9. The apparatus according to claim 7, wherein the information further indicates that the apparatus does not support access of the first type of UE and the second type of UE.

10. An apparatus, comprising a processor and a non-transitory storage medium storing executable instructions, wherein the instructions, when executed by the processor, cause the apparatus to:
obtain a master information block (MIB) from a base station, wherein the MIB carries information indicating that a system information block (SIB) is not sent from the base station to a first user equipment (UE), wherein the SIB is usable for configuring system information shared by a first type of UE and a second type of UE, wherein the first UE is the first type of UE or the second type of UE; and
determine, according to the information carried in the MIB, that the base station does not support access of the first type of UE or the second type of UE, wherein the first type of UE is a type of UE which works at a specific frequency width of a carrier, and the specific frequency width is less than bandwidth of the carrier, and the second type of UE is a type of UE which supports coverage enhancement.

11. The apparatus according to claim 10, wherein the information is one bit, a first state of the one bit indicates that the SIB is not sent from the base station, and a second state of the one bit indicates that the SIB is sent from the base station.

12. The apparatus according to claim 10, wherein the information further indicates that the base station does not support access of the first type of UE and the second type of UE.

* * * * *